US008862920B2

(12) United States Patent
Branover et al.

(10) Patent No.: US 8,862,920 B2
(45) Date of Patent: Oct. 14, 2014

(54) POWER STATE MANAGEMENT OF AN INPUT/OUTPUT SERVICING COMPONENT OF A PROCESSOR SYSTEM

(75) Inventors: Alexander Branover, Chestnut Hill, MA (US); Maurice B. Steinman, Marlborough, MA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 478 days.

(21) Appl. No.: 13/162,425

(22) Filed: Jun. 16, 2011

(65) Prior Publication Data
US 2012/0324258 A1    Dec. 20, 2012

(51) Int. Cl.
*G06F 1/32*    (2006.01)

(52) U.S. Cl.
CPC ........... *G06F 1/3206* (2013.01); *Y02B 60/1235* (2013.01); *G06F 1/3275* (2013.01); *Y02B 60/1225* (2013.01); *G06F 1/3253* (2013.01)
USPC ............. 713/323; 713/310; 713/324; 710/18; 710/19

(58) Field of Classification Search
CPC ..... G06F 1/3203; G06F 1/3206; G06F 1/325; G06F 1/3278; G06F 1/3287
USPC ........................ 713/310, 323, 324; 710/18, 19
See application file for complete search history.

(56) References Cited

U.S. PATENT DOCUMENTS

| | | | | |
|---|---|---|---|---|
| 5,832,286 A * | 11/1998 | Yoshida | .................. | 713/324 |
| 6,859,886 B1 * | 2/2005 | Johnson | ................. | 713/600 |
| 7,039,755 B1 * | 5/2006 | Helms | ..................... | 711/106 |
| 7,299,371 B2 * | 11/2007 | Day et al. | ................ | 713/323 |
| 7,441,128 B2 * | 10/2008 | Ho et al. | .................. | 713/300 |
| 2010/0287394 A1 | 11/2010 | Branover et al. | | |
| 2011/0078478 A1 | 3/2011 | Branover et al. | | |
| 2012/0166843 A1 * | 6/2012 | Muralidhar et al. | ........... | 713/323 |

* cited by examiner

*Primary Examiner* — Thuan Du
(74) *Attorney, Agent, or Firm* — Park, Vaughan, Fleming & Dowler, LLP

(57) ABSTRACT

A method of regulating power states in a processing system may begin with a processor component reporting a present processor power state to an input-output hub, where the present processor power state corresponds to one of a plurality of different processor power states ranging from an active state to an inactive state. The input-output hub receives data indicative of the present processor power state and, in response to receiving the present processor power state, establishes a lowest allowable hub power state that corresponds to one of a plurality of different hub power states ranging from an active state to an inactive state. The method continues by determining a present hub power state for the input-output hub, wherein depth of the present hub power state is less than or equal to depth of the lowest allowable hub power state.

17 Claims, 3 Drawing Sheets

POWER STATE MANAGEMENT OF AN INPUT/OUTPUT SERVICING COMPONENT OF A PROCESSOR SYSTEM

TECHNICAL FIELD

Embodiments of the subject matter described herein relate generally to processor architectures of the type utilized with computer systems. More particularly, embodiments of the subject matter relate to transitioning an input-output hub of a processor system between various power states.

BACKGROUND

Computer systems and their processor architectures have various power savings states in order to provide an appropriate balance between power savings and performance. Many computer systems are compliant with the Advanced Configuration and Power Interface (ACPI) specification. In accordance with the ACPI specification, a processor may be operated in different power states identified as power states C0-Cn. Higher values for the index n correspond to deeper or "lower" power states, less activity, and, consequently, lower power consumption. Deeper power states, however, require longer transition times to place the processor back into the active execution state. In practice, deeper processor power states are characterized by higher interrupt latency because power saving is achieved by reducing the frequency of the clock and/or reducing the voltage. Voltage may be reduced to a retention level where state is preserved in the core or voltage may be reduced beyond the retention level. As state is lost, the latency to resume operation is increased. Further, the cache may also have its voltage reduced beyond retention levels. The deeper the power state is, the longer the exit latency in order to resume code execution.

In current computer systems, the north bridge represents a central decision node for transitioning the processor and dynamic random access memory (DRAM) into and out of low power states. In this context, the north bridge refers to those parts of a processor integrated circuit other than the processor cores. Thus, the north bridge may include functionality such as the memory controller and power management. Typically, power transitioning decisions are made by the north bridge, following operating system (OS) requests for specific processor power states. The depth of the processor power state is determined based on internal monitors and activity trackers in the north bridge.

Other components or circuits in a processor system, including input/output (I/O) servicing components such as the input-output hub, may also be controlled to operate in different power saving states or modes. For example, the power state of the processor component and the power state of the input-output hub could be managed independently.

BRIEF SUMMARY OF EMBODIMENTS

A method of regulating power states of an I/O servicing component in a processing system is provided. The processing system includes a processor component and the I/O servicing component, which services interrupts and packets for the processor component. The method involves receiving, at the I/O servicing component, an indication of a present processor power state of the processor component, and enabling, at the I/O servicing component, at least one servicing power state for the I/O servicing component. The enabling step is influenced by the present processor power state.

Also provided is a method of regulating power states in a processing system comprising a processor component and an input-output hub coupled to the processor component. The method may begin with the processor component reporting a present processor power state to the input-output hub, where the present processor power state corresponds to one of a plurality of different processor power states ranging from an active and highest processor power state to an inactive and lowest processor power state. The method continues with the input-output hub receiving data indicative of the present processor power state and, in response to receiving the data, establishing a lowest allowable hub power state that corresponds to one of a plurality of different hub power states ranging from an active and highest hub power state to an inactive and lowest hub power state. The method continues by determining a present hub power state for the input-output hub, wherein depth of the present hub power state is less than or equal to depth of the lowest allowable hub power state.

An exemplary embodiment of a semiconductor-based processor system is also provided. The system includes a processor component, an I/O servicing component coupled to the processor component, and control logic. The processor component operates in a plurality of processor power states ranging from an active and highest processor power state to an inactive and lowest processor power state. The I/O servicing component operates in a plurality of servicing power states ranging from an active and highest servicing power state to an inactive and lowest servicing power state. The control logic obtains a present processor power state of the processor component, and selects one of the plurality of servicing power states as a present servicing power state for the I/O servicing component, using a servicing power state floor established by the present processor power state.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

The subject matter presented here relates to a technique for managing and regulating power states in an I/O servicing component of a processing system. For example, the I/O servicing component may be an input-output hub for the processor component of the processing system. Alternatively, the I/O servicing component might be implemented as or integrated with, without limitation: a north bridge; an "uncore" component, that is, a component of a processor that is not part of the processor core; a network processor; or an I/O controller. The processor component can be operated in one of a plurality of different processor power states, which range from an active power state to an inactive (power saving) power state. Similarly, the I/O servicing component can be operating in one of a plurality of different servicing power states, which range from an active power state to an inactive (power saving) power state. The present processor power state influences the servicing power states available to the I/O servicing component at any given time. In particular, the present processor power state can be used to designate or set a "baseline" or "floor" for the power state of the I/O servicing component. For the exemplary embodiment described below, the present processor power state is associated with a designated servicing power state that represents the lowest (i.e., deepest power saving) power state available to the I/O servicing component.

Figure 1:
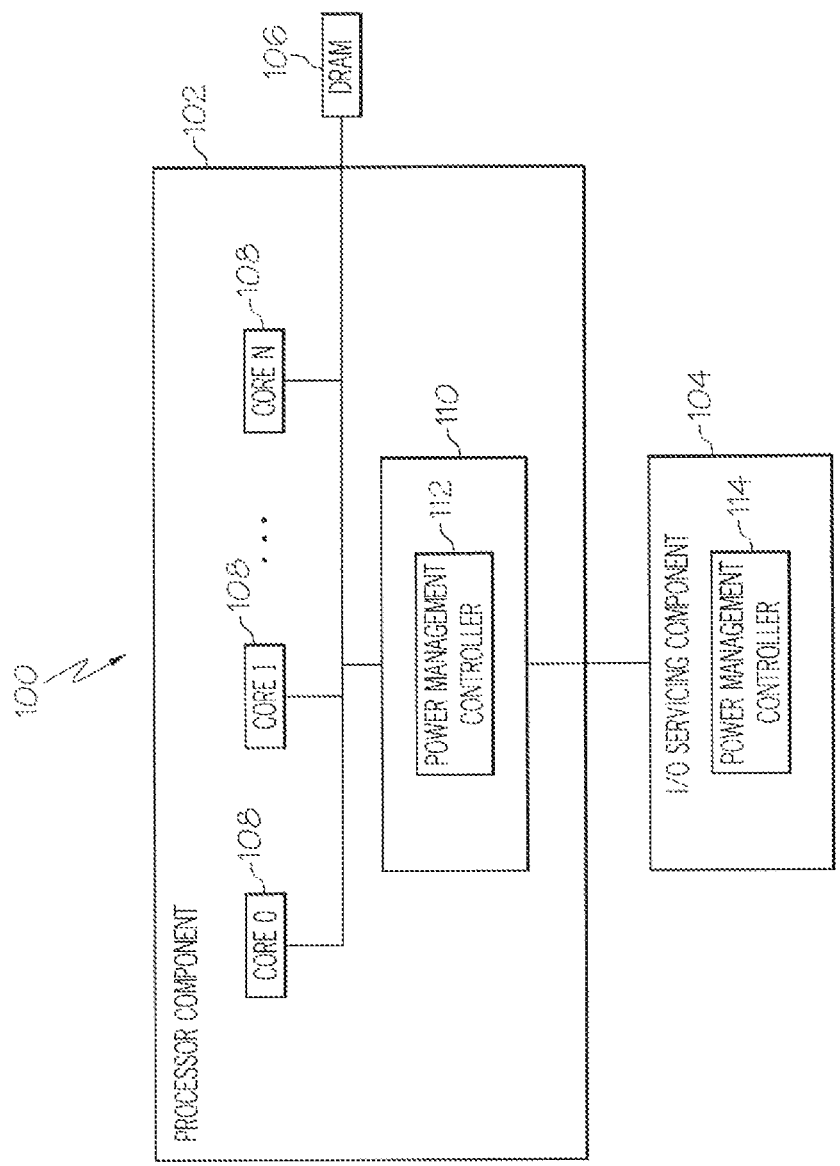
FIG. 1 is a schematic block diagram representation of an exemplary embodiment of a processing system.

FIG. 1 is a schematic block diagram representation of an exemplary embodiment of a processing system 100. The processing system 100 is semiconductor-based in that it is realized using semiconductor integrated circuit technology. The processing system 100 may be realized as a digital device (e.g., a central processing unit (CPU), a microcontroller, a digital signal processing (DSP) unit, a graphics processing unit (GPU), or a memory device), an analog device, or a mixed analog-digital device (e.g., a transceiver). For purposes of illustration, the subject matter is described as it may be implemented to control the transitioning of a microprocessor and/or its constituent components between power states.

The illustrated embodiment of the processing system 100 generally includes, without limitation: a processor component 102; an I/O servicing component 104; and system memory, such as dynamic random access memory (DRAM) 106. The processor component 102 and the I/O servicing component 104 may be realized on a single integrated circuit die, or they could be implemented on separate dies. The processor component 102 includes one or more cores 108 and a north bridge controller 110. A power management controller 112 (or any suitably designed and operated control logic) may be implemented in the north bridge controller 110. The I/O servicing component 104, which is communicatively coupled to the processor component 102, includes a power management controller 114 (or any suitably designed and operated control logic). As explained in more detail below, the power management controllers 112, 114 manage and regulate the different power states for the processor component 102 and the I/O servicing component 104.

The I/O servicing component 104 is operatively coupled to the processor component 102 and is configured to service interrupts, activity requests, packets, and/or other data for the processor component 102. For the non-limiting example described here, the I/O servicing component 104 represents an input-output hub (sometimes referred to as the south bridge) of the processing system 100. In practice, the I/O servicing component 104 functions as an interface between the processor component 102 and various input and/or output devices, systems, or components (not shown) such as human interface devices, peripheral devices, or the like.

The processor component 102 (more specifically, the cores 108 of the processor component 102) can transition between a plurality of different processor power states that range from an active, shallowest, or highest processor power state (e.g., the C0 state) and an inactive, deepest, or lowest processor power state (e.g., the C6 state) using a protocol (which, in some embodiments, may be considered a "handshake" protocol) between the power management controller 112 and microcode that is stored in microcode memory and executed on one of the cores 108. The power management controller 112 may in general be a circuit or logic configured to perform one or more functions in support of the cores 108 situated on the processor component 102.

In the illustrated embodiment, the power management controller 112 is implemented in the north bridge controller 110, which may include a circuit (or sub-circuit) configured to perform power management control as one of the functions of the overall functionality of the north bridge controller 110. Furthermore, in other embodiments, the circuit represented by the north bridge controller 110 may also be implemented as a distributed circuit, in which respective portions of the distributed circuit may be configured in one or more of the processor cores 108, but operating on separate power planes, that is, using a different power supply than the section or sections of the cores 108 functionally distinct from the portion or portions of the distributed circuit. The separate power planes, or distinct/separate power supplies may thereby enable each respective portion of the distributed circuit to perform its functions even when the rest of the cores 108 (e.g., the respective main section or sections of the cores 108 that are functionally distinct from the respective portion of the distributed circuit) are in a reduced power state. This power independence enables embodiments that feature a distributed circuit, distributed controller, or distributed control circuit performing at least some or all of the functions performed by the north bridge controller 110.

The power management controller 112 may be configured to communicate with each core 108. More specifically, the power management controller 112 may be configured to handle power state requests received from the cores 108 and interface with the microcode memories to provide action requests and receive action acknowledgement to/from the microcode executing on the cores 108. The north bridge controller 110 may also interface with the I/O servicing component 104, and the DRAM 106. The power management controller 112 may also provide control over the supply voltage and operating clock of each core 108 and may determine whether transitioning to a requested processor power state is to be performed.

In one embodiment, either operating system or hardware-based inference logic tracking the idle states of the cores 108 may request one or more of the cores 108 to transition into a reduced processor power state. It should be noted that while one or more of the cores 108 of a multi-core processor are in a reduced power state, the other cores 108 may remain in a fully operational state, executing tasks.

The I/O servicing component 104 is also configured to operate in a plurality of different servicing power states ranging from an active and highest servicing power state to an inactive and lowest servicing power state. The power management controller 114 represents the control logic utilized by the I/O servicing component 104 to carry out the various power management and power state transition operations described in more detail below. Briefly, this control logic obtains a present processor power state of the processor component 102, and selects one of the plurality of servicing power states as a present servicing power state for the I/O servicing component 104, using a servicing power state floor established by the present processor power state. FIG. 1 depicts the power management controller 114 implemented in the I/O servicing component 104. Alternatively (or additionally), the power management controller 114 could be implemented in the processor component 102 and/or in another component or module of the processing system 100.

Figure 2:
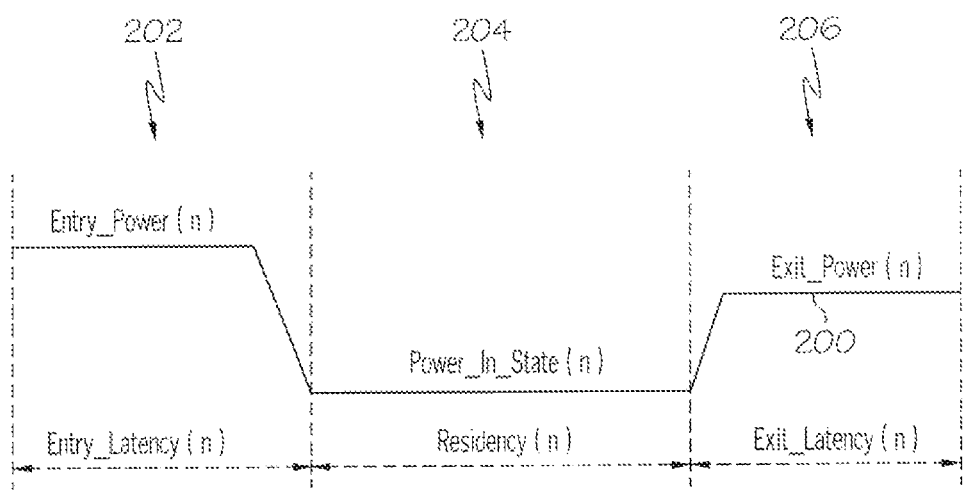
FIG. 2 is a graph that illustrates transition characteristics associated with entry into a low power state of a component, and exit from the low power state.

FIG. 2 is a graph that illustrates transition characteristics associated with entry into a low power state of a component, and exit from the low power state. The characteristics shown in FIG. 2 may apply to a processor component, a core of a processor component, an I/O servicing component, or the like. The plot 200 in FIG. 2 depicts a trade-off between transitioning into a reduced power state and state residency. The reduced power state may be broken down into three regions: state entry 202 (i.e., from the current power state to a reduced power state identified by the index n); state residency 204; and state exit 206 (i.e., from the reduced power state to an exit power state, which may be different than the current power state). Each of these three regions is associated with a respective amount of consumed energy. Energy consumed during entry and exit transitions is dependent on transition activity and the time spent for the transition. As a general rule, the deeper or lower the power state, the longer the transition time required, and the more energy consumed transitioning into that power state. Therefore, a reduced power state Cn is considered an efficient state (i.e., recommended to be entered) only if its Cn state residency is sufficiently long to make the overall power consumption getting into and out of the Cn state (and spent in the Cn state) lower than power consumption in the original power state for the same duration of time.

There is a cost to transitioning to a reduced power state defined by the entry and exit power consumption. The deeper the power state is, the longer it takes to transition in and out of it. Longer transition latency makes the power state less power efficient and introduces functional risk for workloads requiring well-bounded interrupt latency (e.g., playbacks and network workloads). The problem of interrupt latency is generally addressed by design methods that seek to reduce exit latency (e.g., faster voltage and/or frequency ramp-up, faster restore of the processor state in cases where the processor loses its state in the reduced power state, etc.).

Transitioning to lower power states may impose performance constraints on the system—for example, low power states may add to the time to service interrupts. This extra latency may have a negative effect on performance of some video, audio, or network applications that are very sensitive to long interrupt service latency. This sensitivity may be perceived as user-visible or user-audible real-time artifacts (i.e., lost frames, late audio stream, etc.) or may be manifested as an underperformance of the application. If this happens on a frequent basis, the performance loss or real-time effects become more apparent, negatively impacting the user experience.

As is well understood, the input-output hub (i.e., the I/O servicing component 104) is an important component than links the processor component with the input/output domain of the processing system 100. Indeed, the power state of the input-output hub has an impact on the overall interrupt and traffic service latency experienced by the processing system 100. Although the processing system 100 may support any number of distinct and different power states for the I/O servicing component 104 (referred to herein as "servicing power states" to distinguish those power states from the "processor power states" of the processor component 102), this exemplary embodiment supports four different servicing power states. These servicing power states are identified as states IOH-0, IOH-1, IOH-2, and IOH-3, with IOH-0 corresponding to the fully active, shallowest, and highest servicing power state available to the I/O servicing component 104, and IOH-3 corresponding to the inactive, deepest, and lowest servicing power state available to the I/O servicing component. As described in more detail below, the I/O servicing component 104 can independently select (or be controlled to select) one of the plurality of supported servicing power states, subject to a lowermost state that is dictated by the present processor power state. In this regard, the present processor power state determines a floor for the servicing power state, and the I/O servicing component 104 is prevented from entering any servicing power state that is deeper or lower than the floor.

For this particular example, the IOH-0 power state corresponds to the fully active state of the I/O servicing component 104, where no power management actions are in place. By definition, there is no exit latency associated with the IOH-0 power state. The IOH-1 power state represents the second deepest servicing power state. In the IOH-1 power state, the following power management actions may be taken: (1) Peripheral Component Interconnect Express (PCIE) link is in the L1 state; (2) delay-locked loop (DLL) is shut down; and (3) clock gating is applied. Exit latency associated with the IOH-1 power state is primarily caused by DLL relock and PCIE link wakeup, and this exit latency is typically within the range of about 5-10 microseconds. In the IOH-2 power state, the following power management actions may be taken: (1) PCIE link is in the L1 state; and (2) phase-locked loop (PLL) is powered down. Exit latency associated with the IOH-2 power state is primarily caused by PLL relock and PCIE link wakeup, and this exit latency is typically within the range of about 30-40 microseconds. In the IOH-3 power state, the following power management actions may be taken: (1) PCIE link is in the L2 state; (2) PLL is powered down; and (3) power gating actions might be applied. Exit latency associated with the IOH-3 power state is primarily caused by PLL relock, PCIE link wakeup, and power gating exit, and this exit latency is typically longer than about 100 microseconds. Again, a different number of servicing power states could be supported by an embodiment of the processing system 100, and the associated power management actions and exit latency times may vary from that presented above.

As mentioned above, the processor component 102 is configured to operate in a plurality of different processor power states, ranging from an active and highest processor power state to an inactive and lowest processor power state. Although the processing system 100 may support any number of distinct and different processor power states, this exemplary embodiment supports four different processor power states. These processor power states are identified as states C0, C1, C2, and C6 (note that the C3-C5 states as defined by the ACPI specification are not used in this example), with C0 corresponding to the fully active, shallowest, and highest processor power state available to the processor component 102, and C6 corresponding to the inactive, deepest, and lowest processor power state available to the processor component 102.

For this particular example, the C0 power state corresponds to the fully active state of the processor component 102, where no power management actions are in place. By definition, there is no exit latency associated with the C0 power state. The C1 power state represents the second deepest processor power state. In the C1 power state, the following power management actions may be taken: (1) cores are halted; and (2) clocks are ramped down. Exit latency associated with the C1 power state is typically about 10 microseconds. In the C2 power state, the following power management actions may be taken: (1) cores are halted; (2) clocks are ramped down; and (3) retention voltage is applied. Exit latency associated with the C2 power state is typically about 30 microseconds. In the C6 power state, the following power management actions may be taken: (1) all cores are power gated; and (2) optionally, very low voltage is applied. Exit latency associated with the C6 power state is typically within the range of about 50-100 microseconds. In various embodiments, a different number of processor power states could be supported by the processing system 100, and the associated power management actions and exit latency times may vary from that presented above.

The determination, selection, and management of the processor power states may be performed in accordance with any desired methodology or approach. For example, one technique that could be utilized by the processing system 100 is described in United States Patent Application Publication number 2010/0287394, the content of which is incorporated by reference herein. Another technique that could be utilized by the processing system 100 is described in United States Patent Application Publication number 2011/0078478, the content of which is incorporated by reference herein.

The processing system 100 can dynamically change its processor power state as needed to reduce overall power consumption and in a manner that is responsive to activity requests, interrupts, direct memory access (DMA) traffic, etc. After a particular processor power state has been selected, designated, or entered, the processing system 100 continues by informing the I/O servicing component 104 of the present processor power state so that the power state of the I/O servicing component 104 can be determined based at least in part on the present power state of the processor component 102. For this particular embodiment, the present processor power state determines or influences the selection of a power state "floor" for the I/O servicing component 104, where the power state floor represents a lowest (i.e., deepest in terms of power saving) allowable servicing power state for the I/O servicing component 104. Stated another way, the present processor power state influences which of the plurality of supported servicing power states are actually enabled for selection and entry by the I/O servicing component 104. In this way, the lowest allowable servicing power state available to the I/O servicing component 104 is correlated to the depth or level of the present processor power state. This power management scheme for the I/O servicing component 104 takes advantage of the exit latency characteristics of the processor component 102. In this regard, a relatively deep inactive processor power state indicates that the processor component 102 is able to tolerate long interrupt latency. Consequently, it should be safe to place the I/O servicing component 104 into a relatively deep inactive power state due to the interrupt latency tolerance. Conversely, if the processor component 102 is at or near its active power state, then the I/O servicing component 104 should also remain at or near its active power level to avoid performance degradation caused by interrupt latency.

The following description is consistent with the exemplary embodiment presented above, where the processor component can assume one of four different processor power states (C0, C1, C2, or C6). The concepts presented here can, of course, be extended as needed or desired to contemplate more or less than four processor power states. For this implementation, if the present processor power state is the C0 state (i.e., the processor component 102 is in its normal active state) or the C1 state, then only the following power states for the I/O servicing component 104 are enabled: IOH-0 and IOH-1. In other words, the power state floor for the I/O servicing component 104 will be the IOH-1 state, and the I/O servicing component 104 is only allowed to enter either the IOH-0 state or the IOH-1 state (i.e., the IOH-2 state and the IOH-3 state are unavailable). If the present processor power state is the C2 state, then only the following power states for the I/O servicing component 104 are enabled: IOH-0, IOH-1, and IOH-2. Thus, the servicing power state floor is the IOH-2 state when the processor component 102 is in the C2 state, and the I/O servicing component 104 is only allowed to enter either the IOH-0 state, the IOH-1 state, or the IOH-2 state (i.e., the IOH-3 state is disabled). If the present processor power state is the C6 state, then all of the supported servicing power states are enabled and made available to the I/O servicing component 104. Accordingly, the servicing power state floor is the IOH-3 state when the processor component 102 is in the C6 state, and the I/O servicing component 104 is allowed to select any of the four servicing power states, based on its own determination.

In accordance with the above scheme, the depth of the present servicing power state will be less than or equal to the depth of the lowest allowable servicing power state, which is determined or otherwise influenced by the present processor power state. Moreover, the depth of the lowest allowable servicing power state will be proportional to the depth of the present processor power state. In other words, relatively active processor power states will result in higher servicing power state floors, and relatively dormant processor power states will result in lower servicing power state floors.

Figure 3:
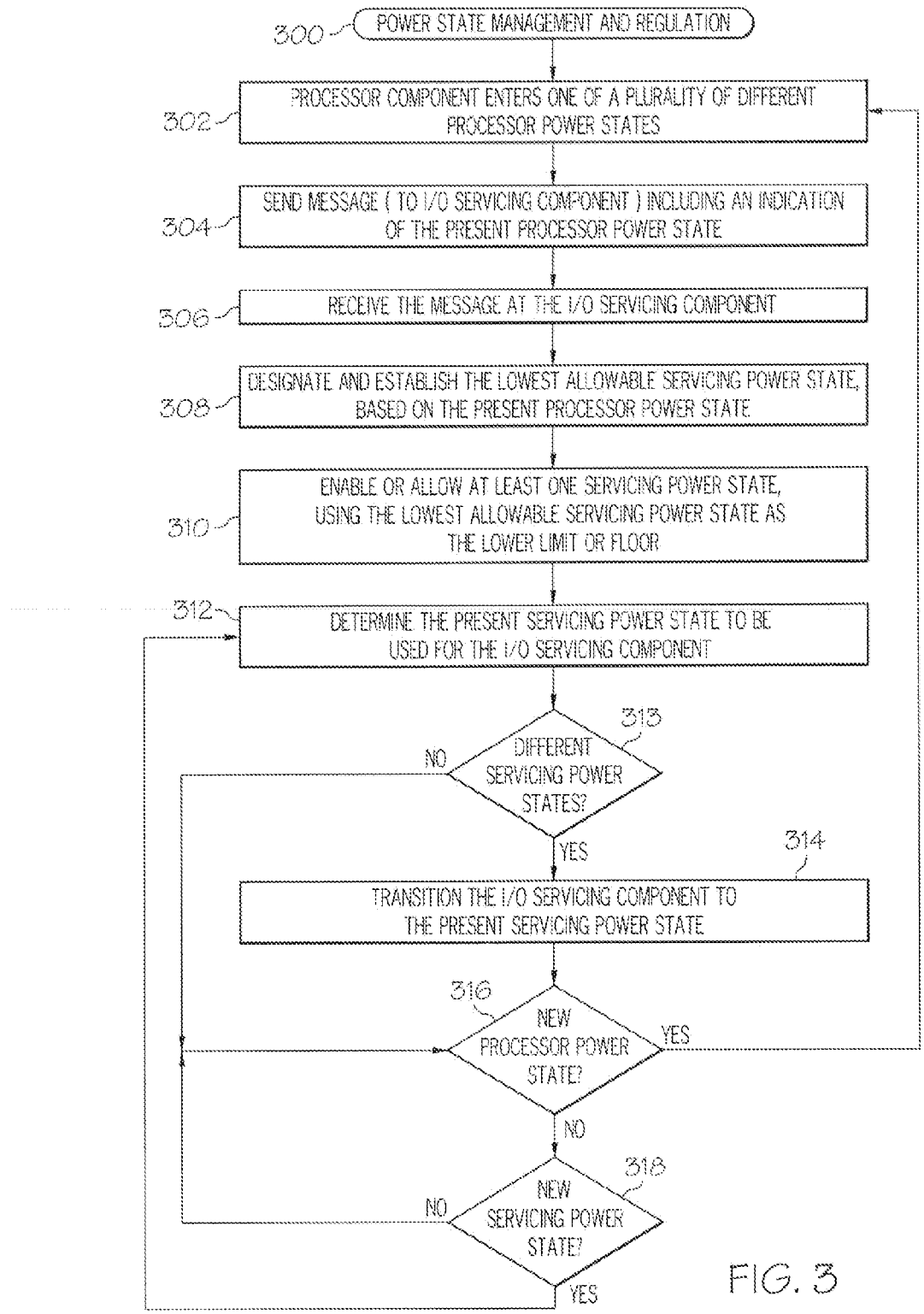
FIG. 3 is a flow chart that illustrates an exemplary embodiment of a process for managing and regulating the power state of an I/O servicing component of a processing system.

FIG. 3 is a flow chart that illustrates an exemplary embodiment of a process 300 for managing and regulating the power state of an I/O servicing component of a processing system. The various tasks performed in connection with the process 300 may be performed by the processing system 100 described above, and for illustrative purposes the following description of the process 300 may refer to elements mentioned above in connection with FIG. 1. In practice, portions of the process 300 may be performed by different elements of the described system, e.g., the power management controller 112, the I/O servicing component 104, the power management controller 114, or the like. It should be appreciated that the process 300 may include any number of additional or alternative tasks, the tasks shown in FIG. 3 need not be performed in the illustrated order, and the process 300 may be incorporated into a more comprehensive procedure or process having additional functionality not described in detail herein. Moreover, one or more of the tasks shown in FIG. 3 could be omitted from an embodiment of the process 300 as long as the intended overall functionality remains intact.

In accordance with the process 300, the processor component enters one of a plurality of different processor power states (task 302), which may range from an active (i.e., the highest, uppermost, shallowest, or top-level) power state to an inactive (i.e., the lowest, lowermost, deepest, or bottom-level) power state. The entered power state of the processor component is referred to herein as the present processor power state. For this example, the processor component and/or control logic associated with the processor component reports the present processor power state to the I/O servicing component in the processing system. In certain embodiments, the present processor power state is reported to the I/O servicing component using a suitably formatted message that includes or otherwise conveys an indication of the present processor power state (task 304). For example, this message may be sent from the power management controller of the processor component to the power management controller of the I/O servicing component. More specifically, the power state indication can be presented as a two-packet message (<processor node id><power state>), where "processor node id" is an encoding of the processor or processor core (depending on the embodiment), and "power state" is an encoding of the processor power state (e.g., C0-C6). The message can be sent whenever any of the processor nodes or cores changes power state. The message may be sent over a link or bus between the processor and the I/O servicing component (as depicted by the connecting line shown in FIG. 1). In practice, this link or bus may be one of the known industry standards (PCIE, HT-link, etc.) or an internal bus between on-die or on-board parts. The message may also be communicated using discrete wires or signals between the processor and the I/O servicing component. It is also possible that in some embodiments the I/O servicing component can poll the processor state rather than being updated by the processor.

This description assumes that the message and the processor power state indication are successfully received at the I/O servicing component (task 306). This allows the I/O servicing component and/or control logic associated with the I/O servicing component to receive, examine, and otherwise handle data or information indicative of the present processor power state, and to take the appropriate measures. In this regard, the I/O servicing component responds to the present processor power state by designating and establishing the lowest allowable servicing power state (task 308). In certain embodiments, the lowest allowable servicing power state will be one of the plurality of servicing power states supported by the I/O servicing component. Accordingly, the present processor power state will dictate which of the plurality of supported power states is selected for use as the lowest allowable servicing power state. Although task 308 will typically be performed at the I/O servicing component, any control logic or component in communication with the I/O servicing component could perform task 308, depending on the specific implementation and deployment of the process 300.

The lowest allowable servicing power state represents a baseline or floor value that could limit the options available to the I/O servicing component. Once this floor has been established, the process 300 may continue by enabling or allowing at least one servicing power state for the I/O servicing component (task 310). The number and particular servicing power states enabled by task 310 will be defined by the floor, which in turn is influenced or dictated by the present processor power state, as described above. The process 300 can then determine the present servicing power state to be used for the I/O servicing component (task 312), where the present servicing power state is one of the enabled states. Again, the present servicing power state selected at task 312 will have a depth that is less than or equal to the depth of the lowest allowable servicing power state (i.e., the floor value). The newly determined servicing power state may then be compared to the present servicing power state (query task 313) to check whether or not the servicing power states are different. If the newly determined servicing power state is different than the present servicing power state, then the process 300 continues by transitioning the I/O servicing component to the present servicing power state (task 314) using any appropriate technique or methodology. Otherwise, the process 300 may skip task 314 and leave the I/O servicing component in its current servicing power state.

The process 300 assumes that the power states of the processor component and the I/O servicing component can be dynamically reconfigured in an ongoing manner as needed. In this regard, FIG. 3 depicts a query task 316 that checks whether a new processor power state has been entered. If so, then the process 300 may exit or be re-entered at, for example, task 302. The process 300 may also check whether a new servicing power state has been entered (query task 318). If so, then the process 300 may exit or be re-entered at, for example, task 312. This scheme facilitates independent adjustment of the processor power state and the servicing power state (as influenced by the present processor power state).

In certain embodiments and configurations, a processor state notification might be ignored by the I/O servicing component for purposes of setting its power state floor. For example, if the system is currently configured such that it is primarily concerned with maximal battery life (or is running off the battery), the performance aspect may be demoted, and the I/O servicing component could be allowed to reach deeper power states. Accordingly, when the system is using battery power and the user indicates a battery preference, the real-time software (e.g., BIOS, driver) or firmware may configure the I/O servicing component to simply disregard the processor power state. Conversely, when the system is using a stable or continuous power supply such as the a normal AC power supply, the performance aspect is considered and the I/O servicing component will respond to the processor power state in the manner described above.

In yet other embodiments, it may be possible and desirable to provide an equivalent form of communication and messaging from the I/O servicing component to the processor component. Such a feature allows the processor component to be aware of the present operating and power state of the I/O servicing component, and such information could in turn be used by the processor component to make certain performance and/or power decisions.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. In a processing system having a processor component and an input-output (I/O) servicing component to service interrupts and packets for the processor component, a method of regulating power states of the I/O servicing component, the method comprising:
   enabling, at the I/O servicing component, one or more servicing power states for the I/O servicing component dependent on an indication of a present processor power state received by the I/O servicing component, the enabling comprising designating a lowest allowable servicing power state for the I/O servicing component based on the present processor power state; and
   causing the I/O servicing component to operate in one of the one or more enabled servicing power states independent of the present processor power state.

2. The method of claim 1, wherein servicing power states for the I/O servicing component range from an uppermost active power state to a lowermost power conservation state.

3. The method of claim 1, wherein:
   processor power states for the processor component range from an uppermost active processor power state to a lowermost processor power conservation state; and
   the present processor power state corresponds to one of the processor power states.

4. The method of claim 1, further comprising the step of sending a message from the processor component to the I/O servicing component, the message including the indication of the present processor power state.

5. The method of claim 1, wherein the I/O servicing component comprises an input-output hub for the processor component.

6. A method of regulating power states in a processing system comprising a processor component and an input-output hub coupled to the processor component, the method comprising:
   the processor component reporting a present processor power state to the input-output hub, the present processor power state corresponding to one of a plurality of different processor power states;
   the input-output hub, dependent on the present processor power state reported by the processor component, establishing a lowest allowable input-output hub power state, the lowest allowable input-output hub power state corresponding to one of a plurality of different input-output hub power states ranging from an active and highest input-output hub power state to an inactive and lowest input-output hub power state;
   the input-output hub causing the input-output hub to operate in one of the plurality of input-output hub power states at or higher than the lowest allowable input-output hub power state, independent of the present processor power state.

7. The method of claim 6, wherein the determining is performed by the input-output hub.

8. The method of claim 6, wherein the reporting comprises sending a message from the processor component to the input-output hub, the message including an indication of the present processor power state.

9. The method of claim 6, wherein the establishing establishes the lowest allowable hub power state such that depth of the lowest allowable hub power state is proportional to depth of the present processor power state.

10. The method of claim 6, wherein the establishing establishes the lowest allowable hub power state such that depth of the lowest allowable hub power state is correlated to depth of the present processor power state.

11. The method of claim 6, wherein the plurality of different processor power states range from an active and highest processor power state to an inactive and lowest processor power state.

12. A system comprising:
   a processor component configured to operate in a plurality of processor power states;
   an input-output (I/O) servicing component coupled to the processor component to service interrupts and packets for the processor component, the I/O servicing component configured to operate in a plurality of servicing power states; and
   control logic in the I/O servicing component that performs operations for:
      based on an indication of a present processor power state, enabling one or more servicing power states for the I/O servicing component, the enabling comprising designating a lowest allowable servicing power state for the I/O servicing component based on the present processor power state; and
      causing the I/O servicing component to operate in one of the one or more enabled servicing power states independent of the present processor power state.

13. The system of claim 12, wherein the I/O servicing component comprises an input-output hub for the processor component.

14. The system of claim 12, wherein the control logic receives an indication of the present processor power state from the processor component.

15. The system of claim 12, wherein the lowest allowable servicing power state is proportional to the present processor power state.

16. The system of claim 12, wherein the lowest allowable servicing power state is correlated to the present processor power state.

17. The system of claim 12, wherein:
   the plurality of processor power states range from an active and highest processor power state to an inactive and lowest processor power state; and
   the plurality of servicing power states range from an active and highest servicing power state to an inactive and lowest servicing power state.

* * * * *